Jan. 26, 1965 F. R. FLOYD ETAL 3,167,190
TOBACCO HARVESTER WITH ROTATING STICK-HOLDER CONVEYOR
Filed Sept. 12, 1962 4 Sheets-Sheet 1

INVENTOR
FRANCIS R. FLOYD
RALPH M. FLOYD

BY Jones + Young
AGENTS

Jan. 26, 1965   F. R. FLOYD ETAL   3,167,190
TOBACCO HARVESTER WITH ROTATING STICK-HOLDER CONVEYOR
Filed Sept. 12, 1962   4 Sheets-Sheet 2

INVENTOR
FRANCIS R. FLOYD
RALPH M. FLOYD

BY Jones & Young
AGENTS

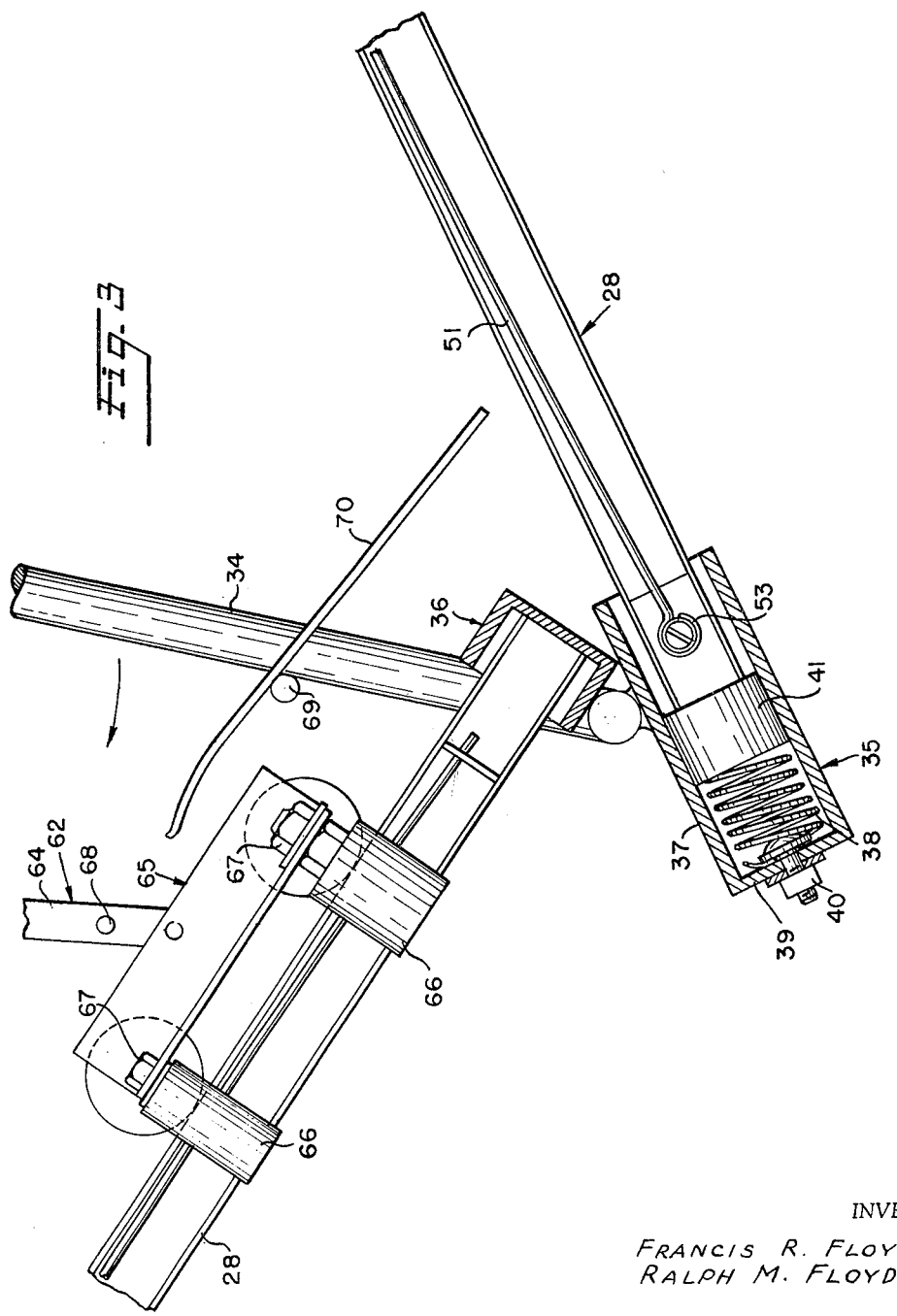

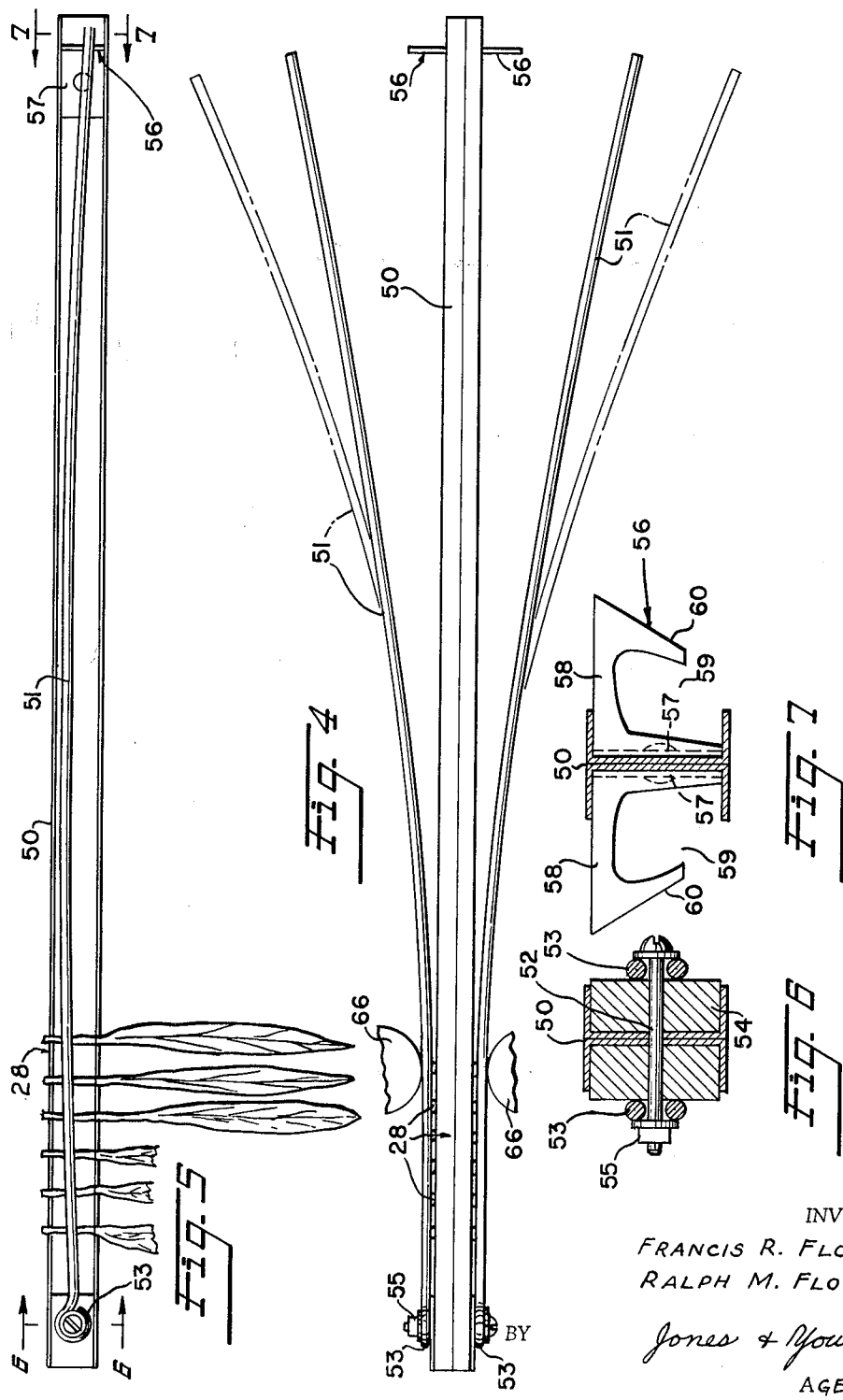

United States Patent Office 3,167,190
Patented Jan. 26, 1965

3,167,190
TOBACCO HARVESTER WITH ROTATING
STICK-HOLDER CONVEYOR
Francis R. Floyd and Ralph M. Floyd, both
% Floyd Brothers, Fairmont, N.C.
Filed Sept. 12, 1962, Ser. No. 223,084
5 Claims. (Cl. 214—5.5)

The present invention relates to harvesting machinery for tobacco crops and the like, and more particularly to new and novel machinery and component parts thereof for the harvesting and handling of tobacco in an improved and highly economical manner.

The harvesting of tobacco and like crops has been almost universally accomplished heretofore by having a mule or horse pull a sled provided with a stack body having retaining burlap side and end walls between the rows of tobacco. The ripe tobacco leaves are manually stripped or otherwise removed from the stalk by workers walking with the sled and placed therein. After a sled is filled with the tobacco leaves, it is pulled out of the tobacco field and taken to a tying station, usually located in close proximity to a curing barn, where the leaves are tied by their butt ends generally by string, cord, or the like, to hang in a suspended state on and along a wooden stick. The stick carrying the tied tobacco leaves in suspended form are next placed in a curing barn and supported at each end thereof along spaced rafters in the barn. The tobacco is then subjected to a curing operation to place the tobacco in a condition for sale to tobacco manufacturers.

This prior method of harvesting and handling the tobacco possesses a great many inherent disadvantages which have become particularly acute in recent years due to a continuously dwindling available farm labor market and a greatly increased wage structure for such labor when it is available. This manner of harvesting is a slow, tedious and laborious operation which is not attractive to present day farmhands. Moreover, a large number of laborers are required to effectively harvest a crop since a tobacco crop usually ripens rapidly, which necessitates the harvesting thereof in a comparatively short time in order to obtain a high yield of high quality or prime tobacco. These factors, even prior to the present day farm labor shortage and wage scale, have generally limited the production, particularly in the South where the greater bulk of tobacco is grown, to a small, generally low-acreage operation, which is in and of itself uneconomical. With the available labor market in short supply and the high wages required by the laborer today, the problem of growing tobacco on an economically sound basis is becoming extremely acute. As a result, a tobacco grower today is faced with a high cost operation which is reflected in the high cost of the manufactured end product and a low return for himself.

Much time, effort, and money have been expended in recent years in an effort to mechanize the harvesting of tobacco to place it on a more efficient and economically attractive basis. For example, one form of powered machinery proposed heretofore cuts the entire plant including stalks and leaves, and ties or otherwise strings the entire plant on racks for transfer to a curing barn. This form of machine has been found to be objectionable due to the great complexity of the machine and high initial cost. Moreover, such machines have not been otherwise entirely satisfactory since they tend to bruise or damage the leaves thus reducing the quality of the end products.

Another form of tobacco harvesting machinery proposed included a power driver frame which moves along the rows with men on the frame picking the ripe leaves from the plant. The leaves are then tied on a stake or stick, and racked on the machinery. This basic operation possesses many desirable characteristics, but the mechanism for moving the stakes and the means for positioning the tobacco leaves thereon have been complex in design and inefficient in operation. As a result, this form of mechanical harvesting machinery has been high in initial cost and possessed a high maintenance and upkeep cost, which has detracted from its general usage.

It is therefore a principal object in the elimination of the foregoing and related disadvantages to provide new and improved apparatus for the harvesting of tobacco and like crops in an efficient and economical manner.

Another object of the present invention is the provision of apparatus for harvestig and handling tobacco and like products that is extremely simple in design, comparatively cheap in initial cost, and requires little maintenance.

Yet another object of the present invention is the provision of apparatus for the harvesting and handling of tobacco in which the tobacco is harvested, affixed to a support, and placed in condition for immediate transfer to a curing barn in a new and improved manner.

A further object of the present invention is the provision of apparatus for the harvesting and handling of tobacco which requires a comparatively few number of workers to operate in harvesting the crop.

Yet another object of the present invention is the provision of apparatus for harvesting and handling tobacco in which the workers can perform the harvesting efficiently and in a far less fatiguing manner than heretofore.

Still another object of the present invention is the provision of apparatus for the harvesting and handling of tobacco in which women can perform the harvesting equally as well as men.

A still further object of the present invention is the provision of apparatus for the harvesting and handling of tobacco having a new and improved conveying mechanism for moving a support or the like past a tobacco affixing station where the tobacco leaves are secured to the support and then transferred to a racking station.

Another object of the present invention is the provision of a new and novel tobacco support or tobacco stick for receiving and supporting tobacco leaves after being stripped from the stalk.

Yet a further object of the present invention is the provision of a new and novel tobacco stick or support for use in a tobacco harvesting machine in which the tobacco leaves are retained thereon in a new and improved manner.

Another object of the present invention is the provision of a tobacco support or stick for use in automatic tobacco harvesting machinery which eliminates the necessity of tying the tobacco onto the stick with strings or the like.

A still further object of the present invention is the provision of a practical, simple, and relatively inexpensive machine for the harvesting and handling of tobacco which permits a greater amount of work to be accomplished with less expense and with less labor, fatigue, and effort on the part of the workmen.

A still further object of the present invention is the provision of machinery for the harvesting or handling of tobacco in which the tobacco leaves are handled very little, thereby greatly reducing bruising or otherwise harming the tobacco leaves during the handling thereof.

Other and further objects of the present invention will become manifest from the ensuing description taken in conjunction with the accompanying drawings.

Broadly stated, the apparatus for harvesting tobacco and the like in accordance with the present invention comprises frame means, means permitting the propelling of the frame means along at least one row of tobacco, at least one means on said frame means for accommodating a worker, said worker accommodating means located on said frame means to permit the worker positioned thereon to strip tobacco leaves from the tobacco plant as the machine moves therealong, hub means mounted on said frame means above the means accommodating the worker, a plurality of spaced, radial arm means extending outwardly from said hub means and adapted for movement past the worker accommodating means, detachable tobacco leaf supporting means positioned between said arms, said support including means for receiving and retaining tobacco leaves placed thereon as the tobacco receiving means passes the worker accommodating means, and means to drive said hub means.

To the accomplishment of the foregoing and related ends, the present invention then consists of the means hereinafter fully described and particularly pointed out in the claims, the annexed drawings and the following description setting forth in detail certain means in the carrying out of the invention, such disclosed means illustrating, however, but one of various ways in which the principle of the invention may be employed.

The present invention is illustrated, by way of example, in the accompanying drawings, in which:

FIG. 3 is an enlarged fragmentary section illustrating one form of means for holding the tobacco fixed between the radially extending arms of the conveyor and also illustrating the follower which rides along the side of the stick to insure the securing of the tobacco leaves to the stick or support member.

FIG. 4 is a top plan view of a preferred form of tobacco stick or support member made in accordance with the present invention illustrating the manner of holding the tobacco leaves thereon.

FIG. 5 is a side elevation of the form of tobacco supporter stick shown in FIG. 3.

FIG. 6 is a section taken along lines 6—6 of FIG. 4.

FIG. 7 is a section taken along lines 7—7 of FIG. 4.

Figure 1:
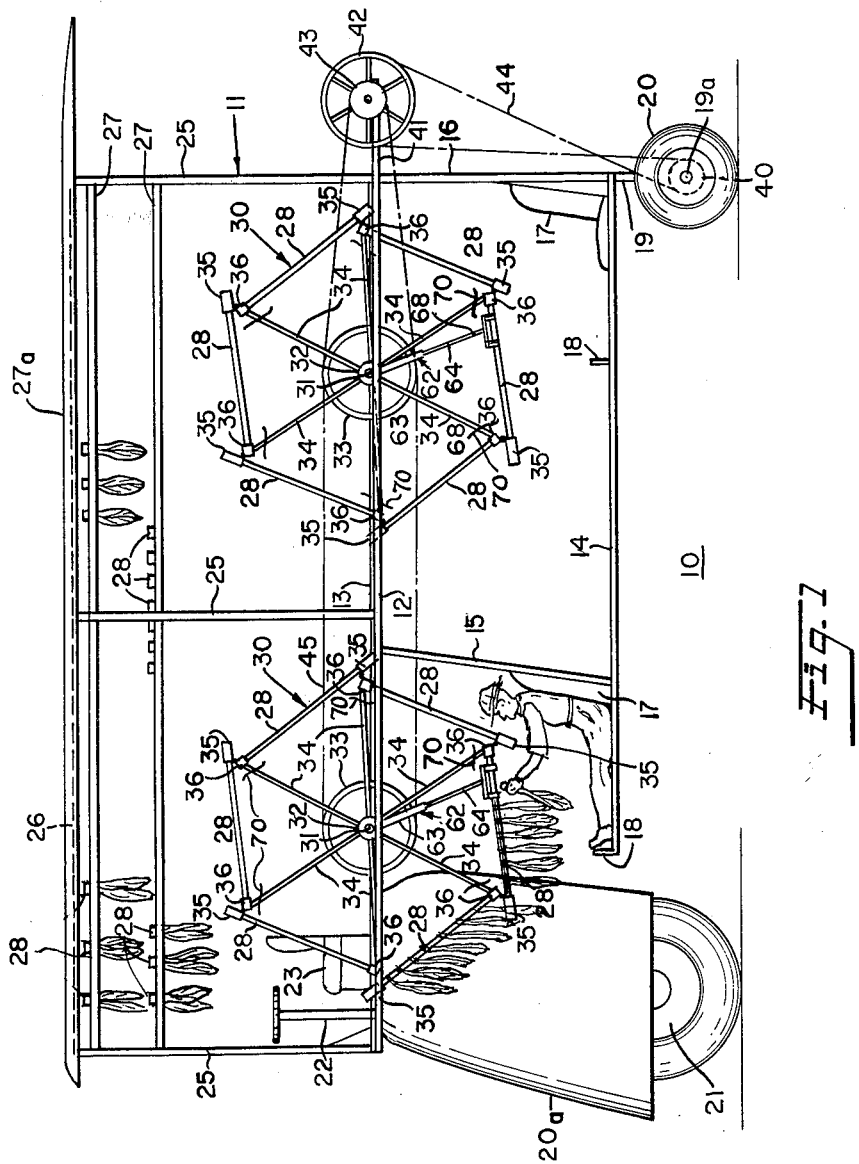
FIGURE 1 is a side elevation of one form of tobacco harvesting machine made in accordance with the present invention illustrating hte manner of picking the tobacco leaves and securing them to a support.
Figure 2:
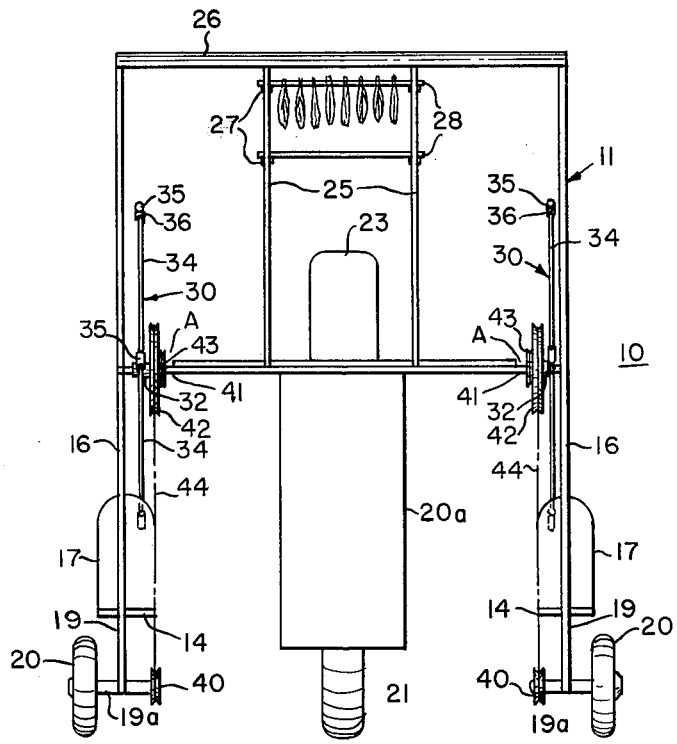
FIG. 2 is an end elevation of the form of the tobacco harvesting machine shown in FIG. 1.

Referring now to the drawings, and with particular reference to FIGS. 1 and 2, one form of a tobacco harvesting machine made in accordance with the present invention, and generally designated by reference numeral 10, is illustrated therein. The harvesting machine 10 comprises an open, generally rectangular frame member, generally designated by reference numeral 11, which is so dimensioned that it will overlie or shade one row of tobacco with one side thereof being in close proximity to the next succeeding row of tobacco. The frame member 11 will be mounted on any suitable wheel assembly to permit ready movement thereof between the rows of tobacco. Similarly, the frame member may be provided with a prime mover, such as, for example, a gasoline motor, to propel same. Alternatively, the frame member may be provided only with a tractor hitch to enable it to be moved by a tractor. The frame construction thus will permit the ripe tobacco leaves to be stripped from two adjoining rows of tobacco in a single pass of the tobacco harvester.

In general, the frame member of the present invention further should be of any design and construction which will provide means for supporting at least two men just above ground level, and in close proximity to the tobacco rows which will enable them to strip the tobacco leaves therefrom. In addition, the frame member must have a support member or platform or the like spaced above the lower support means to provide an area for workers to remove the tobacco sticks carrying the tobacco leaves and arrange them on stick supporting elements mounted on the frame member. Accordingly, any frame construction accomplishing these purposes may be used satisfactorily in the present invention.

As illustrated, the frame member 11 comprises a central or main horizontally disposed rectangular platform frame portion 12 which will lie at a distance well above the top of the tobacco plants to permit its ready movement thereover without coming into contact with the plants.

The width of the platform 12 will be greater than the distance between two rows of tobacco in order to permit the straddling of one row of tobacco and yet permit ready access to the next or adjoining row of tobacco. The main portion 12 is provided with a suitable floor assembly 13 which will, in general, span the greater area of the frame portion thus providing an adequate working area for workers performing duties on this level. However, the floor 13 is not to span a portion of each side edge of the frame portion 12 in order to form a rectangular open area or an elongated slot A along each side edge thereof.

A bottom side frame portion 14 is positioned beneath each of the rectangular openings A formed on the main frame portion 12, and each frame portion 14 will be in substantially vertical alignment with one of the rectangular openings A of the frame portion 12. Each of the bottom side frame portions 14 is connected to the main frame portion 12 by a forward vertical support rod or element 15 and a rear vertical support rod 16, secured therebetween in spaced relation. Each of bottom side frame portions 14 will be spaced from the ground for a distance sufficient to permit a workman sitting thereon to have ready access to each tobacco stalk for removal of ripe leaves therefrom as the harvester 10 moves along the rows of tobacco. The length of each of the bottom side frame portions 14 may be less than the length of the main frame portion, but must be sufficiently long such that two workmen may comfortably be accommodated thereon in seated relationship and in spaced longitudinal alignment with respect to one another. A pair of seat assemblies 17 including a foot rest 18 are secured in longitudinally spaced relationship on each of the bottom side frame portions 14 to accommodate two workers for each of the bottom side frame portions 14 in spaced relation to one another. The construction just defined therefore sets forth an arrangement in which there is provided a top platform having an underslung lower platform along each side edge thereof providing upper and lower work areas that will readily permit the assembly to pass along two rows of tobacco to effect the desired stripping.

To provide the necessary wheeled support for movement of the harvester 10, obviously any desired form of wheel assembly arrangement can be employed. As shown, a downwardly extending support rod 19 is secured at one end to the rear corner of each bottom frame support member 14, with the free end of each rod 19 being provided with the necessary axle assembly 19a for mounting a wheel 20 thereon at each rear corner of the harvester 10. The forward end of the main frame support portion 12 is connected to a power means, generally designed by reference numeral 20a, which is connected through appropriate gears to a wheel assembly 21 in operative driving relationship therewith to rotate same. A steering assembly 22 is operatively connected to the wheel assembly 21 and extends through and above the main frame portion 12. The power means 20a is preferably a gasoline motor and includes all necessary component parts to effect the driving of the wheel assembly 21. Since the power means 20 are generally conventional, no description will be given with respect to the component parts thereof. A seat 23 is mounted on the central housing portion 12 adjacent the wheel assembly 21 to provide a seat for the operator driving the machine. The wheel assembly just described defines what may be termed a tricycle wheel assembly in which the forward wheel is driven by the power means. However, it is to be clearly understood that a four wheel assembly can be employed equally as well. Similarly, it is to be clearly understood that it is within the spirit and scope of this invention to provide a tractor hitch for connecting the harvester 10 to a tractor, which, in turn, would be the means for pulling the harvester along the rows of tobacco.

A plurality of vertical support members 25 are positioned in spaced relationship around the perimeter of the central frame portion 12 with each extending upwardly therefrom for a height in excess of that of the workers standing erect on the frame portion 12. The top free ends of each of the vertical support members 25 are connected to one another by horizontally extending support rods 26, thereby defining a substantially rigid frame construction within which the workers on the main frame portion 12 perform their duties. If desired, a canopy 27a, as shown, is mounted on the top of the vertical support members 25 to provide shade for the workers. To provide means for supporting the tobacco sticks carrying tobacco thereon, a plurality of pairs of laterally spaced tobacco stick support rods 27 are secured in vertically spaced relationship to the vertical support rods 25 positioned centrally at the forward and rear ends of the main frame portion 12. The tobacco stick support rods 27 will extend centrally within and through the formed framework above the main frame portion 12, since adequate work space must be left on either side thereof to receive the tobacco sticks 28. The lateral spacing between the tobacco support rods 27 is slightly less than the length of the tobacco sticks 28, thereby enabling the sticks 28 to be supported between a pair of the rods 27 by their respective ends, with the remainder of the lateral distance being unencumbered for the suspension of tobacco leaves therebetween.

The tobacco conveying means, generally designated by reference numeral 30, is the means for moving the tobacco sticks 28 past a worker where he secures the tobacco thereon, and then transporting the tobacco laden stick to an upper level where it is removed and placed on the stick support rods 27. Each of the elongated areas A of the main frame portion 12 is provided with a pair of the conveyor means in longitudinally spaced relationship mounted therein for rotation in a vertical plane, with the outer perimeter of each conveyor means rotating in front of each seat assembly 17 such that a worker seated thereon has ready access thereto. Since each of the conveying means 30 is identical with the other, description will be had only with respect to one conveyor means.

The conveyor means 30 comprises a fixed shaft 31 mounted on the central frame portion 12 to span the width of the elongated slot A formed therein at a point above and forward of each seat assembly 18. A rotatable shaft or hub 32 is journaled on the fixed shaft 31 for rotation thereon, with such rotation being achieved through a pulley wheel 33 mounted on one end of the hub 32. A plurality of arms or spokes 34 are connected at one end to the hub 32 and extend radially outwardly therefrom in uniformly spaced relationship therearound. The length of the spokes 34 are such that during the rotation of the hub 32, each free end will pass in close proximity to the worker sitting in the seat assembly 17. The radial spacing between the spokes or arms 34 is such that a tobacco stick 28 can be positioned in positive relationship between two adjoining arms in a manner to be more fully described hereinafter.

To provide means for the positive retention of the tobacco sticks 28 during the rotation of the hub 32, reference is now to be had to FIG. 3 wherein one form of such means is shown in detail. Each free end of the arms 34 is provided with two laterally offset socket receptacles 35 and 36 spaced from one another, with each socket receptacle 35 being complementary with the socket receptacle 36 carried by the preceding adjoining arm 34 for receiving a tobacco stick therebetween. The socket receptacle 35 of arm 34 includes a tubular body 37 having the end facing the preceding arm 34 open, with a spring member 38 positioned therein and secured to the closed end 39 thereof by means of a nut and bolt assembly 40. A short floating piston or stop 41 is positioned within the tubular body 37 and operatively associated with the spring member 38, and serves as the engaging means between one end of the tobacco stick 28 and the spring member 38. The socket receptacle 36 of each arm 34 is in the form of a tubular member of lesser length than the tubular body 37 of the socket receptacle 35 and has one end open for receiving one end of the tobacco stick 28 therein. This socket assembly 35 and 36 for each of the radial arms 34 just described results in one spring loaded socket receptacle 35 of one arm 34 having its open end facing and being complementary with the open end of the socket receptacle 36 of the preceding arm 34.

To mount a tobacco stick 28 between the adjoining arms 34 in positive engagement therewith, a worker standing on the central frame portion 12 inserts one end of the tobacco stick 28 in the open end of the tubular body 37 of the socket receptacle 35. The tobacco stick 28 is then pushed further into the socket receptacle 35 with the end of the tobacco stick engaging the piston 41 thereby compressing the coil spring 38 until the opposite end of the stick 28 can be placed in the open end of the socket receptacle 36. A release of the stick 28 results in the spring 38 pushing firmly against the end of the stick 28 positioned in socket receptacle 35, while the other end of the stick is in firm engagement with the socket receptacle 36. To remove the tobacco stick from the conveyor means 30, the tobacco stick 28 is pushed inwardly against the spring 38 of the socket receptacle 35 until the other end of the stick 28 is free of the socket receptacle 36. The stick 28 is then pulled outwardly slightly to free the stick from socket receptacle 36, and then away from and out of the socket receptacle 35. It is thus seen that socket assemblies have been provided which permit an almost instantaneous securing of a tobacco stick in firm positive engagement between the arms 32 and yet enables a worker to free the stick therefrom promptly and with no difficulty.

The means for driving the conveyor means may be any suitable mechanism which will effect the desired rotation of the conveyor. A preferred means from a standpoint of simplicity, ease of operation and economy is a pulley system in which the conveyor means are driven by the rotation of the rear wheels 20 of the harvester 10. To accomplish this, as shown in FIG. 1, the axles 19a of the two rear wheels 19 are each provided with a pulley wheel 40 fixedly secured thereto for rotation therewith. A mounting bracket 41 is secured to each corner of the main frame portion 12 and extends outwardly therefrom in generally vertical alignment with each wheel assembly 20. The mounted bracket 41 is provided with a fixed horizontally extending axle on which pulley wheels 42 and 43 are journaled for simultaneous rotation therearound. The pulley wheel 42 is in vertical alignment with the pulley wheel 40 mounted on axle 19a of wheel assembly 20, and has an endless pulley 44 extending therebetween for rotation of the pulley wheel 42 upon rotation of the wheel 20. The pulley wheel 43 is smaller in diameter than the pulley wheel 42 and is in horizontal alignment with the driving wheel 33 keyed to each of the two hubs 32 of the conveyor means 30 and is provided with an endless belt 45 extending therebetween which will effect the desired rotation of the two hubs 32 of the conveyor means. By this pulley arrangement, it is seen that when the harvester 10 is propelled along the rows of tobacco, the rotation of the rear wheels 19 will effect the rotation of the larger pulley wheel 42, which, in turn, will rotate the pulley wheel 43. This rotation then causes the rotation of the pulley or driving wheel 33 keyed to each hub 32 to effect the desired rotation of the conveyor mechanism 30. It is noted that with this pulley assembly, the conveying means 30 will move at a speed of rotation correlated with the speed of the harvester such that the workers will be able to strip the tobacco leaves and secure them to the tobacco sticks on a single pass.

The tobacco stick 28 which is to be employed in the present invention constitutes a material advance in the art, since it eliminates the need for tying the tobacco leaves to the sticks with cord, string, or the like. To the contrary, the tobacco stick 28 made in accordance with the present invention permits the placing of tobacco leaves thereon by the worker and the securing thereof is accomplished automatically thus materially increasing the production rate of the worker. While the tobacco stick 28 is of particular utility with the tobacco harvester 10 of the present invention, it is to be understood that the tobacco stick 28 may be used equally as well with any type of tobacco harvester employing a conveyor system.

The tobacco stick 28, as shown in FIGS. 4–6, comprises a generally I-channeled, elongated rigid body member 50 of a length sufficient to seat in socket receptacles 35 and 36 in the manner hereinbefore described. The body member 50 may be made of any suitable material that possesses sufficient strength and rigidity to withstand normal handling, but yet be light in weight to facilitate its handling. A preferred material is a light metal, such as, for example, aluminum or magnesium and the like, although some plastics meeting the requirements of strength and rigidity may be employed equally as well. The body member may be made as an integral, one-piece, unitary I-channel member or may be, as illustrated, formed by uniting a pair of U-shaped channel members in back to back relationship by any suitable means, such as, for example, spot welding or the like.

A pair of curved or bowed elongated metal rods 51, capable of being flexed and placed under tension, are secured at one end of the channel body 50 with one rod being in cooperation with one channel portion of the body member 50 and the other rod being in cooperation with the other or opposed channel portion of the body member 50. The function of each rod 51 when placed in a locked and tensioned state with each channel portion in a manner to be more fully described hereinafter is to retain the stems of the tobacco leaves therebetween in a fixed, non-removable state. The rods 51 may be mounted to the channel body member 50 in any suitable manner with FIG. 5 illustrating one such embodiment. As shown, the channel body member 50 at one end is provided with an aperture 52, with one end of each of the elongated rods being bent to form an eye portion 53 of a diameter substantially equal to the diameter of the aperture 52. The eye portions 53 of the rods 51 are not to rest within the channel when secured to the channel body member 50, and accordingly a spacer block 54 having an aperture therethrough is placed in each channel portion of the channel body member 50, with the aperture being in alignment with the aperture 52 of the channel body member 50. A nut and bolt assembly 55 extends through the eye portions 53 of the rods 51 and the aperture 52 in the body member 50 and the aperture in each of the spacer blocks 54 to hold the assembly together.

In an alternative embodiment, each of the rods 51 may be provided with an offset eyelet portion at one end which would enable the rods 50 to be seated within the channel portions of the channel body 50 at its point of attachment with the remainder of the rod lying normally outside the channel portion. With this embodiment, obviously the spacer blocks 54 would not be needed.

Each channel body of the channel body member 50 at its opposite end thereof is provided with a latch or catch member, generally designated by reference numeral 56, positioned therein and which serves as the means for receiving and retaining the free end of each of the elongated rods 51 in a locked and tensioned state to retain the stems of the tobacco leaves therebetween. The catch 56 includes a base portion 57 secured within each channel portion by any suitable means, such as, for example, a rivet, as shown, and a catch portion 58 secured at one end to one end of the base portion 57 and extends outwardly therefrom at right angles thereto. The catch portion 58 has one side provided with a large slot or opening 59 adjacent its lower end, with the remainder of the side edge being angled upwardly forming a camming surface 60. The camming surface 60 will function in a manner to be more fully described hereinafter to facilitate the moving of the free end of the rod 51 into the slot 59 to lock the rod 51 in position.

As hereinbefore indicated, each of the rods 51 is curved or bowed outwardly. The curvature of the rods 51 is outwardly from the point of attachment of each to the channel body member 50 and the degree of curvature is quite important in order to insure the positive retention of the tobacco leaves to the channel body member 50. The radius of curvature of each of the rods 51 is not uniform, but rather, the portion of the rod 51 adjacent the end secured to the channel body member 50 extends very gradually outwardly from its point of attachment to the body member 50, and, in fact, lies almost in close parallel relationship therewith, leaving a space therebetween just sufficient to receive the stems of the tobacco leaves between it and the channel portion of the body member 50. The central portion of the rod 51 has a greater radius of curvature, with the upper portion adjacent the free end of the rod 51 having a still greater radius of curvature. This construction thus produces an assembly in which the rods 51 will extend in close relationship to each channel portion adjacent its lower portion 50, and then curves outwardly at its upper free portion. The importance of the curvature is that when the free end of the rod 51 is locked in place in the latch member 56, the rod 51 will not bow outwardly away from the channel member 50 but rather, will be slightly bowed within the channel portion of the channel body member 50 thus further insuring the positive retention of the tobacco leaves therein.

In the utilization of the tobacco stick or support 28 just described in the harvester 10, means must be provided to effect a progressive closing of each of the elongated rods 51 secured to the channel body 50 of the support 28 into an ultimately latched or locked position as tobacco leaves are applied therebetween during the rotational movement of the conveyor means 30. Accordingly, any means which are fixedly secured to the harvester 10 in close proximity to the worker positioned in each seat means 17, and which will engage each rod 51 of the support or stick 28 as the tobacco stems are inserted between the rod and the channel portions of the channel member 50, and which, during the rotational movement of the supports 28, will continue to force the rods 51 inwardly until the free ends thereof engage in the latch portion may be used.

An illustrative embodiment of one form of means to effect the desired closing of the rods 51 is shown in FIGS. 1 and 3. However, it is to be clearly understood that this particular embodiment is illustrative in character only, since there are various other forms of closure means that can be employed to effect the desired latching of the rod 51 into the latch portion. As shown, the closure means generally designated by reference numeral 62 includes a hollow tubular member 63 fixedly mounted at one end of the shaft 31 on which the conveyor means 30 is mounted, and extends downwardly therefrom in the direction of the seat means 17. A telescoping inner rod 64 is positioned within the tubular member 63 and extends downwardly therefrom in axial alignment therewith, and stops short of the path of travel of the supports 28 during the rotational movement of the conveyor means 30. It is preferred that the inner tubular member 64 be spring loaded or the like with respect to the hollow tubular member 63 such that the inner tubular member 64 will be continuously urged radially outwardly or downwardly. This assembly results in a fixed tubular construction having an outer free arm which is axially movable inwardly radially, the necessity of this being to permit the assembly to clear one stick after the closing of the rod members carried thereby.

The free end of the inner tubular member 64 is provided with a pair of angled plate members 65 by means of a nut and bolt assembly, rivet, or the like, with one angle plate lying on each side of the inner rod member 64 and extending outwardly in opposed directions. The angle plate members 65 are so positioned with respect to the inner tubular member 64 that they will lie in a plane substantially parallel to the plane of movement of the particular support member which the closure member 62 is to engage. At least one roller 66 is secured to the free flange portion of each of the flange elements 65, and extends downwardly therefrom in substantially right angle relationship thereto and is secured by means of a nut and bolt assembly 67. The rollers 66 of each of the flange portions are laterally spaced from one another for a distance to substantially equal the outside diameter between the rod members 51 when the same are in a latch position, thereby defining a guideway between which the support member 28 must pass, with the rods 51 being in engagement with the rollers 66. This construction thus will result in the support member 28, when being rotationally moved by the conveyor means 30, passing between the rollers 66 just after the first tobacco leaves are placed thereon. As additional tobacco leaves are placed between the rods 51 and the channel portions of the channel body member 50 as the support 28 is rotated, the rods 51 are progressively compressed inwardly into the channel portions of the channel body member 50 by continued engagement with the rollers, and upon the continued rotation of the conveyor means 30 until the desired quantity of tobacco leaves are placed along the entire length of the support member 28. When this stage is reached, the support member 28 will be almost completely through the rollers 66, and the free ends of the rods 51 which engage the camming surface 60 of the latch portions 56 have been snapped into tight engagement, thus locking the rods 51 within the channel portion, thereby holding the tobacco leaves in tight engagement therebetween.

To move the closure member 62 out of contact with the support member 28 after the closing of the rod members 51 has been effected therein, the inner tubular member 64 is provided with an offset pin or rod 68 extending outwardly therefrom at right angles thereto, and functions as a cam member to force the inward axial movement of the rod 64. To effect the camming inwardly of the inner rod member 64 each of the radial arm members 34 is provided with a rod 69 outwardly offset and in substantially right angle relationship thereto, and in substantially parallel relationship with the rod 68 carried by the inner tubular member 64. Each of the rods 69 carried by each of the radially extending arms 34 is provided with a substantially stiff camming leaf member 70 extending forwardly in the direction of rotation of the conveyor means 31, and is adapted to engage the under surface of the camming rod 68 to force the inner rod member 64 inwardly upon the closing and latching of the rods 51 of one member. During the inward compressed position of the inner rod member 64 as a result of the action of the cam leaf member 70, the rotation of the conveyor means will continue until the next subsequent support member 28 has been moved into position, at which time the camming leaf member of the radial arm member 34 will become disengaged from the cam rod 68 carried by the inner rod member 64, thereby resulting in the return of the closure member 62 to its normal position, and engaging the side edges of the rod members 51 of the next succeeding stick to be filled.

As has been hereinbefore indicated, the socket receptacles 35 and 36, in which the ends of the support 28 are to be positioned are laterally offset with respect to the conveyor arms 34 of the conveyor means. This construction permits rotational movement of the conveyor arms 34 to move the supports 28 through the spaced rollers 66 to effect the closing of the rods 51 and to permit the conveyor rods 34 to pass by the inner and outer tubular members 63 and 64 without obstruction. However, it is to be understood that the support members 28 may be positioned in the socket members directly between the radial arms 34 of the conveyor means 30 in a non-offset relationship. When this is done, the closure means 62 must consist of duplicate parts, with inner and outer tubular members 63 and 64 being mounted on the conveyor shaft in spaced relationship to define a spaced channel through which the arms will pass during the rotational movement of the conveyor means.

In the operation of the harvester 10 illustrated herein, the machine will be driven to the field and will straddle one row of tobacco along one side, with the remaining side being in close proximity to the next adjacent row of tobacco. As the harvester 10 moves slowly down the field, the rear wheels 20 of the harvester through the chain drive mechanism will effect the rotation of the conveyor means 30. A worker standing on the platform 13 of the main support member 12 at each of the conveyor means 30 inserts a tobacco leaf support member 28 in the socket members 35 and 36, in the manner hereinbefore described, with the free ends of the rod 51 being adjacent socket 36. With the insertion of the support member 28, the end to which the rod members 51 are mounted will be positioned foremost such that this end will be the lead one of the support member 28 during its rotational movement. As the conveyor means 30 turns, the support member 28 rotates clockwise.

The support member 28 passes through the slotted opening A in front of the worker seated on seat means 17 of the lower frame member 14. As the support member 28 moves in front of the worker, he inserts the stems of the tobacco leaves that he has stripped between each of the rod members 51 and the channel portions of the channel body member 50. Due to the close spacing initially of the rods 51 adjacent the end of the channel body member 50 to which it is connected, the leaves will be retained therein until the forward end of the support member 28 engages the spaced roller means 66, which will effect the closing or compressing of the rod members 51 inwardly within the channel portions of the channel body member 50. The worker continues to place the tobacco leaves that he has stripped between the rods 51 and the channel portion of the channel body member 50 until it is filled, with the rods 51 being continuously and progressively compressed inwardly until the free ends of each snaps into the latch portions 62.

The support member 28 loaded with tobacco leaves is freed from the closure member 62, which is telescoped inwardly by the camming member 70 and rotates upwardly through the slotted opening A of the central frame support member 12 where it is removed by the worker stationed thereon in a manner hereinbefore described. The loaded tobacco support 28 then is suspended between the frame support members 27. A fresh support member 28 is thereafter reinserted between the radial arms 34 of the conveyor means 30 and the operation is repeated.

As will be observed, this operation is a continuous one in which a number of support members are continuously moving in either an unloaded state, a loaded state, or a state of being loaded. When the entire frame support member has been loaded with support members carrying the tobacco means, the harvester 10 is then driven to a curing barn where the loaded support members are then placed in a suspended state within the curing barn to effect the curing.

While there have been described herein what are at present considered preferred embodiments of the invention, it will be obvious to those skilled in the art that modifications and changes may be made therein without departing from the essence of the invention. It is therefore to be understood that the exemplary embodiments

We claim:

1. Tobacco harvesting apparatus for use in harvesting tobacco leaves and securing same on tobacco leaf supporting means comprising frame means, means permitting the propelling of the frame means along at least one row of tobacco, at least one support means on said frame means for accommodating a worker, said worker accommodating support means located on said frame means to permit the worker positioned thereon to strip tobacco leaves from the tobacco plant as the apparatus moves therealong, hub means mounted on said frame means above the support means accommodating the worker, a plurality of spaced, radial arm means extending outwardly from said hub means and adapted for movement in a vertical plane past the worker accommodating support means, means adjacent the outer free end of each of said arm means for detachably receiving tobacco leaf supporting means between each of said arms said means including socket members having their open ends facing in opposite directions for receiving the respective ends of tobacco leaf supporting means, and means for driving said hub means.

2. Tobacco harvesting apparatus for use in harvesting tobacco leaves and securing same on tobacco leaf supporting means comprising frame means, means permitting the propelling of the frame means along at least one row of tobacco, at least one support means on said frame means for accommodating a worker, said worker accommodating means located on said frame means to permit the worker positioned thereon to strip tobacco leaves from the tobacco plant as the apparatus moves therealong, hub means mounted on said frame means above the support means accommodating the worker, a plurality of spaced, radial arm means extending outwardly from said hub means and adapted for movement in a vertical plane past the worker accommodating seat means, tobacco leaf supporting means detachably positioned between said arms, said supporting means including means for receiving and retaining tobacco leaves placed thereon as the tobacco receiving means passes the worker accommodating means, said means including socket members having their open ends facing in opposite directions for receiving the respective ends of tobacco leaf supporting means and means to drive said hub means.

3. Tobacco harvesting apparatus for use in harvesting tobacco leaves and securing same on tobacco leaf supporting means comprising frame means, said frame means including an upper frame portion and a pair of lower frame portions laterally spaced from one another below each side edge of said upper frame portion, means permitting the propelling of the frame means along at least one row of tobacco, a pair of longitudinally spaced seat means on each of said lower frame means for accommodating a worker on each of said seat means, said worker accommodating seat means located on each of said lower frame portions to permit the worker seated thereon to strip tobacco leaves from the tobacco plant as the apparatus moves therealong, and conveying means mounted on said upper frame portion above each of said seat means accommodating the worker for movement of tobacco support means in a vertical plane in close proximity to each worker positioned on said seat means, said conveying means including rotatable mounting means on said frame means, means to rotatably drive said mounting means, a plurality of radial arm members secured at one end to said mounting means, and connecting means secured adjacent the free end of each arm member for detachably receiving a tobacco support between each arm said means including socket members having their open ends facing in opposite directions for receiving the respective ends of tobacco leaf supporting means, and means for locking the tobacco leaves in place on the leaf supporting means.

4. Tobacco harvesting apparatus in accordance with claim 3 wherein said connecting means adjacent the end of each radial arm includes a spring loaded socket member and non-spring loaded socket member, said socket members having their open ends facing in opposite directions with the spring loaded socket member being in cooperative relationship with a non-spring loaded socket of one adjacent radial arm member and the non-spring loaded socket member being in cooperative relationship with the spring loaded socket of the other adjacent radial arm member.

5. A tobacco harvesting apparatus in accordance with claim 4 wherein said socket members are laterally offset.

References Cited in the file of this patent
UNITED STATES PATENTS

| | | |
|---|---|---|
| 428,512 | Morris | May 20, 1890 |
| 428,522 | Petree | May 20, 1890 |
| 2,564,614 | Sowers | Aug. 14, 1951 |
| 2,704,158 | Long | Mar. 15, 1955 |
| 2,786,585 | Davies et al. | Mar. 26, 1957 |
| 2,797,827 | Mish | July 2, 1957 |